Figure 1:
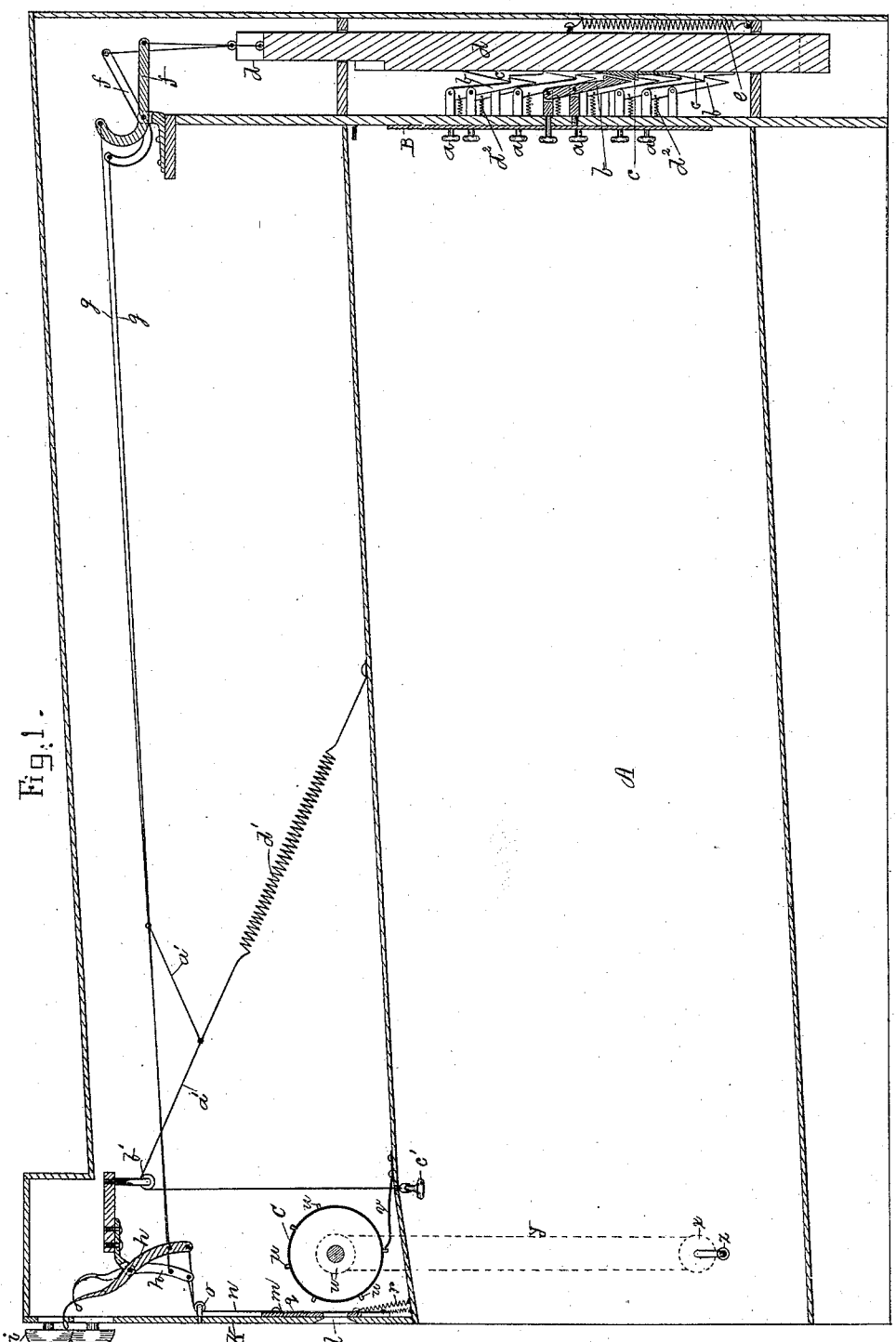

(No Model.)
2 Sheets—Sheet 1.

R. LACOUSE.
SHOOTING GALLERY.

No. 307,776.
Patented Nov. 11, 1884.

Witnesses.
S. N. Piper
E. B. Pratt

Inventor.
Richard Lacouse
by R. H. Eddy att'y (No Model.) 2 Sheets—Sheet 2.
R. LACOUSE.
SHOOTING GALLERY.
No. 307,776. Patented Nov. 11, 1884.
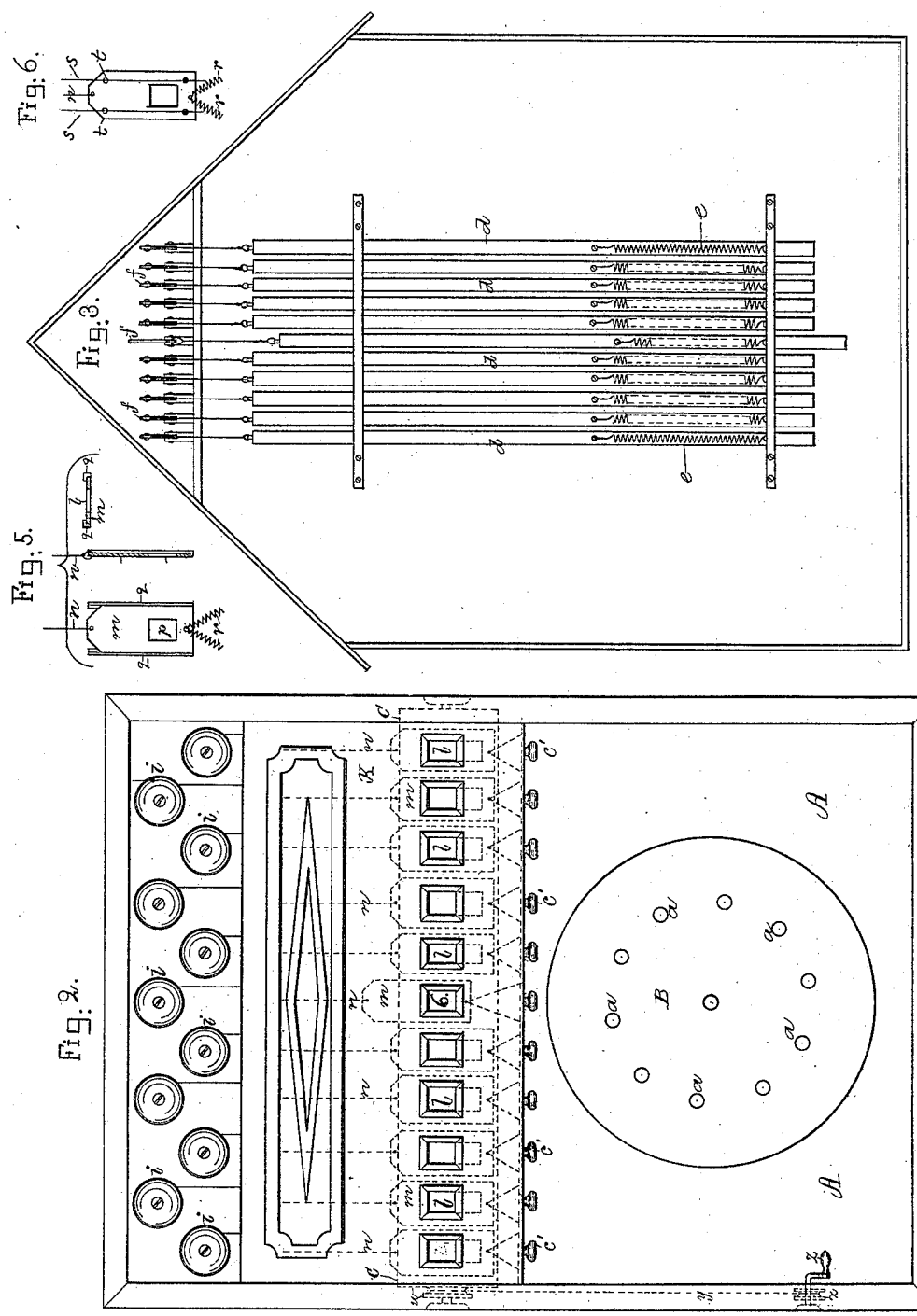
Witnesses.
S. N. Piper
E. D. Pratt
Inventor
Richard Lacouse.
by R. H. Eddy atty.

UNITED STATES PATENT OFFICE.

RICHARD LACOUSE, OF GLOUCESTER, ASSIGNOR, BY MESNE ASSIGNMENTS, TO HIMSELF AND MORRILL SUMPTER, OF BOSTON, MASSACHUSETTS.

SHOOTING-GALLERY.

SPECIFICATION forming part of Letters Patent No. 307,776, dated November 11, 1884.

Application filed March 24, 1884. (No model.)

*To all whom it may concern:*

Be it known that I, RICHARD LACOUSE, of Gloucester, in the county of Essex, of the Commonwealth of Massachusetts, have invented a new and useful Improvement in Shooting-Galleries; and I do hereby declare the same to be described in the following specification and represented in the accompanying drawings, of which—

Figure 1 is a longitudinal and vertical section, and Fig. 2 a front end elevation, of a shooting-gallery provided with my invention, the nature of which is defined in the claims hereinafter presented. Fig. 3 is a front elevation of the bars and levers in rear of the target. Fig. 4 is a side view of the numbered cylinder or indicator C, to be described. Fig. 5 shows a front view, a vertical section, and a transverse section, of one of the perforated slides of the indicator. Fig. 6 is a rear view of one of such slides.

In the said drawings, A represents a gallery having at its rear part a target, B, which may be circular, as shown, or of any other proper form. This target is provided with a series of bull's-eyes or sliding knobs, $a\ a$, &c., one of which is at the center of the target, and is surrounded by the others arranged in a circle at equal distances apart. To each bull's-eye or knob there is pivoted a catch-lever, $b$, to co-operate with a catch, $c$, projecting from one of a series of vertical weights or bars, $d$, arranged in rear of the lever-catches. A spiral spring, $e$, connected to each bar $d$ and to the frame of the gallery, serves to depress or pull downward the bar on the bull's-eye being struck by a bullet and forced inward. Each of the bars $d$ is suspended from one of a series of curved levers, $f$. A wire, $g$, connects the shorter arm of each lever $f$ with that of one of a series of hammers, $h$, adapted to a series of bells, $i$, arranged on a board, $k$, situated over the front end of the gallery in manner as represented. This board has in it a series of rectangular openings, $l$, arranged as shown, and corresponding in number to that of bull's-eyes of the target. In rear of each of the said openings is a sliding shutter or door, $m$, which by a cord, $n$, passing around a pulley, $o$, is connected with the lower arm of one of the bell-hammer levers $h$. Each of these slides or shutters has in it a perforation, $p$, corresponding in size to the opening $l$ in front of such shutter. Furthermore, each shutter is adapted to slide vertically between parallel guides $q\ q$, fixed to the back of the board $k$, one or more spiral springs, $r$, for depressing the shutter being applied to it and the top of the gallery. Instead of such guides, each shutter may be guided by stationary wires $s\ s$, going through eyes or staples $t\ t$, projecting from the shutter, all being as shown in Fig. 6. Directly in rear of the series of shutters is a rotary cylinder or drum or indicator, C, on whose periphery there are arranged, as shown, a series of ranges of numbers, there being in each range numbers, as shown, corresponding to that of the bull's-eyes. The cylinder has projecting from it a series of teeth, $u$, to operate with a spring-pawl, $v$, in arresting the cylinder on it being turned from time to time to carry the ranges of numbers in succession in rear of the range of openings $l$. There is on the arbor of the cylinder a grooved pulley, $w$, to engage with a wheel, $x$, by means of an endless band, $y$, arranged as shown in Fig. 1. By taking hold of and turning a crank, $z$, affixed to the wheel $x$, such wheel may be revolved to effect the turning of the cylinder or drum C, as may be required. There is attached to each wire $g$ a cord, $a'$, that goes around a guide-pulley, $b'$, and extends down into the gallery, and is provided with a knob, $c'$, all being as shown in Fig. 1. A spring, $d'$, attached to the top of the gallery and to the cord $a'$, serves to raise the knob after each downward pull of it. Each of the catch-levers $b$ has a spring, $d^2$, attached to its shorter arm, such spring being to move the catch-lever into engagement with the catch of the bar $d$ on a descent of such bar.

On a person shooting a bullet against either bull's-eye of the target, such bull's-eye will be borne backward, so as to disengage its catch-lever $b$ from the catch $c$ of the bar $d$, directly in rear of such bull's-eye. On such taking place, the bar $d$ will be drawn downward by its spring $e$, whereby not only will one of the bells be sounded, but the shutter $m$, connected with the bell-hammer, will be raised upward, so as to carry the opening of such shutter directly in rear of its opening $l$, and thus enable a person to see through both openings the number that on the cylinder C may indicate the bull's-eye that may have been struck. The bull's-eyes have no numbers on them; but each range of numbers on the cylinder has in it eleven numbers, the latter being the number of the bull's-eyes of the target. The numbers of one range of the indicator C do not correspond with those of the next range, such being to prevent, when all the shutters are down, a party shooting from knowing what number on the cylinder will be directly in rear of any shutter of any of the bull's-eyes. He can only see the number after he may have hit a bull's-eye. After the shooter may have fired a number of shots—as three, for instance—the raised shutters are to be depressed and the indicator is to be partially revolved, so as to bring a succeeding range of numbers immediately in rear of the shutters.

I claim—

1. The combination of the target, having the series of movable knobs or bull's-eyes, with the series of bells and their hammers, and mechanism for operating such hammers, as described, by means of the bull's-eyes, and with the stationary perforated board and series of movable shutters, and the indicator or numbered cylinder provided with mechanism for operating them, as explained.

2. The combination of a cord, $a'$, guide-pulley $b'$, knob $c'$, and spring $d'$ with each shutter-raising mechanism, consisting of the bell-hammer $h$, cord $n$, guide-pulley $o$, and the wire $g$ and its lever $f$, bar $d$, catch $c$, and catch-lever $b$ of the bull's-eyes, as set forth, the cord $a'$ being extended from the wire $g$ and connected with the spring $d'$, substantially as represented.

3. The combination of the target, having the series of movable knobs or bull's-eyes, with the perforated board $k$, its series of movable shutters, and the numbered cylinder or indicator arranged in rear of the latter, such shutters having springs for depressing them and mechanism for raising them by means of the bull's-eyes, under circumstances and in manner substantially as represented.

RICHARD LACOUSE.

Witnesses:
R. H. EDDY,
E. B. PRATT.